Sept. 2, 1924.  W. C. HAMMATT  1,507,282

PAVEMENT

Filed April 14, 1923

William Cushing Hammatt INVENTOR

ATTORNEY

Patented Sept. 2, 1924.

1,507,282

UNITED STATES PATENT OFFICE.

WILLIAM CUSHING HAMMATT, OF SAN FRANCISCO, CALIFORNIA.

PAVEMENT.

Application filed April 14, 1923. Serial No. 631,999.

*To all whom it may concern:*

Be it known that I, WILLIAM CUSHING HAMMATT, a citizen of the United States, residing at 1125 Francisco Street, in the city and county of San Francisco, State of California, have invented a new and useful Improvement in Pavements, of which the following is a full, clear, and exact description, reference being had to the accompanying drawing, forming a part of this specification and explaining its nature.

My invention relates to an improvement in the class of pavements which are wholly or partially composed of Portland cement concrete.

The pavements composed wholly and in part of concrete formed of a mineral aggregate, bound together by Portland cement, as usually and heretofore designed and constructed, are faulty in the following particular, to wit:

Said Portland cement concrete is placed in a thin slab directly in contact with the subsoil, and during the process of setting of the concrete the original water from the mixture is drawn therefrom by the capillary action of said subsoil, weakening said slab at the bottom and for a certain distance toward the interior of the slab. The proportion of the slab affected by the removal or depletion of its water content varies with the thickness of the slab, and in slabs of the ordinary thickness of from four to six inches, the weakening is very material regardless of what manner of curing the upper surface of the slab may be employed. My improvement consists in the interposing between the subsoil and the slab sufficient water proofing material to eliminate the capillary action of the subsoil, thus reproducing in effect the results attained in laboratory tests in slab construction.

I attain this object in the manner illustrated on the accompanying drawing, in which—

Figure 3:
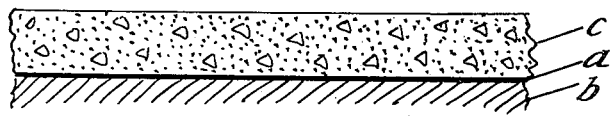
Figure 4:
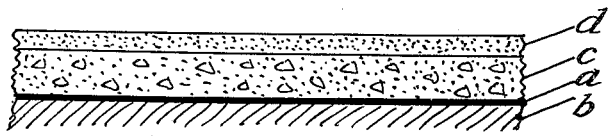

Figure 3 is a vertical section through a pavement consisting of Portland cement concrete laid on a prepared subgrade water proofed by means of asphalt, tar, oil or other similar material applied directly to said subgrade by means of spraying, pouring, brushing, swabbing or raking without the use of a fabric; and Figure 4 is a vertical section through a pavement consisting of two or more courses, the lowest of which is composed of Portland cement concrete laid on a prepared subgrade water proofed with asphalt, tar, oil or other similar material applied by sprinkling, pouring, painting, brushing or raking on said subgrade without the use of a fabric.

Figure 1:
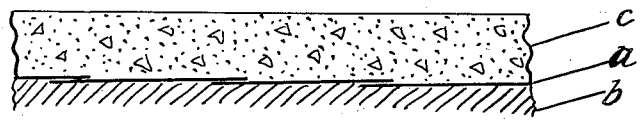
Figure 1 is a vertical section of a pavement consisting of a slab of Portland cement concrete and water proofing composed of overlapping layers of building paper, roofing felt or other fabric of a like nature, laid on a prepared subgrade.
Figure 2:
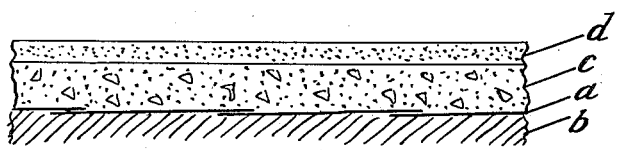
Figure 2 is a vertical section through the pavement composed of two or more courses, the lowest of which is composed of Portland cement concrete, and a water proofing layer consisting of building paper, roofing felt or other water proof fabric laid on a prepared subgrade.

In Figure 1 the letter (*a*) represents the water proofing layer, letter (*b*) represents the subsoil, the letter (*c*) represents the cement concrete pavement. In Figure 2 the letter (*a*) represents the water proofing layer, letter (*b*) represents the subsoil, letter (*c*) represents the cement concrete base, and letter (*d*) represents the wearing surface. In Figure 3 the letter (*a*) represents the water proofing layer, letter (*b*) represents the subsoil, letter (*c*) represents the cement concrete pavement, and in Figure 4 the letter (*a*) represents the water proofing layer, letter (*b*) represents the subsoil, letter (*c*) represents the cement concrete base and the letter (*d*) represents the wearing surface. In the figures shown on the attached drawing, and hereinabove described, it is not the intention to make them or any part of them of a particular scale, or to limit the improvement to pavements of a particular thickness or dimension, or composed of any particular combination or size of aggregate or proportions of aggregate and cement. The figures above referred to are sketches showing in a general way the relative order and position of the various parts of which the pavement is composed.

In the following claim the word "pavement" is intended to mean and is hereby defined as any slab resting on the soil, either in its natural state or artificially prepared by excavating or filling, for the purpose of distributing superimposed weight or taking abrasive wear, whether said slab is used in the construction of vehicular roadways, sidewalks, athletic fields, building floors, tank bottoms, or whatsoever similar structure.

I claim:—

A device of the character above described, comprising a pavement slab of concrete composed of mineral aggregate, Portland cement and water in any proportion, separated from the subsoil by a water proof sheet consisting of building paper, roofing felt or any kind of fabric water proof in character before laying or made so in the process of laying by means of asphalt, tar, oil, paint or other water repellent element or compound.

WILLIAM CUSHING HAMMATT.

Witnesses:
WESTON SMALL,
J. E. TULLOCK.